United States Patent [19]

Mollett et al.

[11] Patent Number: 4,808,433

[45] Date of Patent: Feb. 28, 1989

[54] TREATMENT OF ARCHIVAL MATERIAL

[75] Inventors: Christopher C. Mollett, Near Chester; Christine E. Butler, Leatherhead; Michael L. Burstall, Guildford, all of England

[73] Assignee: The British Library, London, England

[21] Appl. No.: 907,549

[22] Filed: Sep. 12, 1986

[30] Foreign Application Priority Data

Sep. 12, 1985 [GB] United Kingdom ............... 8522631
Jan. 7, 1986 [GB] United Kingdom ............... 8600293
Feb. 7, 1986 [GB] United Kingdom ............... 8603104

[51] Int. Cl.$^4$ ............................................. B05D 3/06
[52] U.S. Cl. ....................................... 427/36; 427/44
[58] Field of Search ................... 427/36, 35, 391, 44; 422/22; 162/192

[56] References Cited

U.S. PATENT DOCUMENTS

| | | | |
|---|---|---|---|
| 3,020,178 | 2/1962 | Sweeney et al. | 427/391 |
| 3,065,041 | 11/1962 | Suen | 8/116 |
| 3,183,056 | 5/1965 | Pfeiffer | 8/116.2 |
| 3,522,158 | 7/1970 | Garnett et al. | 427/44 |
| 3,549,510 | 12/1970 | Casalina | 204/159.12 |
| 3,676,182 | 7/1972 | Smith | 117/60 |
| 3,698,925 | 10/1972 | Salz et al. | 427/140 |
| 3,703,353 | 11/1972 | Kusterer et al. | 427/255.1 |
| 3,721,579 | 3/1973 | Barrett | 427/36 |
| 3,726,709 | 4/1973 | Garratt et al. | 427/36 |
| 3,748,241 | 7/1973 | Garnett et al. | 204/159.2 |
| 3,912,837 | 10/1975 | Pesek et al. | 427/44 |
| 3,969,549 | 7/1976 | Williams et al. | 427/248 |
| 4,091,167 | 5/1978 | Okada et al. | 428/213 |
| 4,148,949 | 4/1979 | Casper et al. | 427/391 |
| 4,237,185 | 12/1980 | Lombardi et al. | 428/337 |
| 4,323,591 | 4/1982 | Wendling et al. | 427/53.1 |
| 4,442,145 | 3/1984 | Probst et al. | 427/391 |

FOREIGN PATENT DOCUMENTS

| | | |
|---|---|---|
| 527043 | 10/1940 | United Kingdom . |
| 572959 | 11/1945 | United Kingdom . |
| 572995 | 11/1945 | United Kingdom . |
| 607769 | 9/1948 | United Kingdom . |
| 1039444 | 8/1966 | United Kingdom . |
| 1069953 | 5/1967 | United Kingdom . |
| 1211720 | 11/1970 | United Kingdom . |
| 1333865 | 10/1973 | United Kingdom . |
| 1338150 | 11/1973 | United Kingdom . |
| 1350668 | 4/1974 | United Kingdom . |
| 1449814 | 9/1976 | United Kingdom . |
| 1596827 | 9/1981 | United Kingdom . |
| 2156830 | 10/1985 | United Kingdom . |

OTHER PUBLICATIONS

Burstall et al., "Improving the Properties of Paper by Graft Copolymerization", Institute of Paper Conservation Conference; Oxford, 4/86.
Ed King, "New Hope for Decayed Paper", *Library Conservation News*, #12, 7/86.
Bull. Inst. Paper Chem.; 52; Aug. 2, 1981, p. 141 abstract 1171.
K. Ward, "Chemical Modification of Papermaking Fibers," pp. 167–171, 185–215 (1973).
ICCM Bull., vol. VII, Nos. 2 & 3, Sep.–Dec. 81, pp. 62–72, (Garnett, Levot & Major).
ICCM Bull, vol. 2, 1979 (Garnett & Major), pp. 49–50.
Paper Cons. News, 1979, vol. 10, No. 2.
Tappi, 45, pp. 390–400 (1962) (Schwab et al.).
Burstall et al., "Graft Copolymerization as a Method of Preserving Papers: Problems and Potentialities," Sep. 1984.
Advances in Macromolecular Chemistry, 1970, vol. 2, pp. 1–88.
Bull. Inst. Paper Chem. 55, No. 8, Feb. 1985, p. 893 Ab. 8452(M).
Bull. Inst. Paper Chem. 49, No. 10, Apr. 1979, p. 955 Ab.8816.
Davis, ACS 193, pp. 223–240 (1981).

*Primary Examiner*—Norman Morgenstern
*Assistant Examiner*—Marianne L. Padgett
*Attorney, Agent, or Firm*—Pennie & Edmonds

[57] ABSTRACT

A process for the treatment of archival material such as books and other bound volumes. The treatment includes a radiation-induced polymerization within the paper of the archival material of at least one mono-unsaturated vinyl monomer, selected from the esters of acrylic acid and α-lower alkyl-substituted acrylic acids, and at least one multi-unsaturated vinyl monomer. The process, which is carried out in a substantially non-aqueous solvent-free system, may be used to improve the structure of paper as well as to provide some protection against past and future degradation of the paper.

47 Claims, 5 Drawing Sheets

TREATMENT OF ARCHIVAL MATERIAL

This invention relates to the treatment of archival material, more especially books and other bound volumes.

Harrod's Librarian's glossary of terms used in librarianship, documentation, book crafts and reference books, 5th ed.; ed. R. Prytherch; Gower, 1984, defines an archival document as ". . . a document which is expected to be kept permanently as near as possible in its original form for the evidence which it may afford both in itself and within its context.".

U.S. patent application Ser. No. 708,620 describes and claims a process for the treatment for archival material, which comprises the radiation-induced polymerisation, within the paper, of a vinyl monomer or a monomer mixture comprising one or more vinyl monomers, irradiation being carried out in the presence of the monomer or monomers, and the process being carried out in a substantially non-aqueous system.

The monomer component comprises one or more mono-unsaturated vinyl monomers selected from the esters of acrylic acid and the esters of α-lower alkyl-substituted acrylic acids. Acrylates and methacrylates, more especially ethyl acrylate, have been found to be amongst the most suitable monomers, and can be polymerised with an acceptable dose of radiation under mild reaction conditions.

Irradiation is carried out with γ-rays or X-rays, and a mutual irradiation technique is used, that is, the irradiation is carried out in the presence of the monomer. Surprisingly, there is substantially homogeneous deposition of the polymer: deposition is substantially uniform within each single paper sheet and over entire books. In contrast, if monomer is added after irradiation, polymerisation occurs only at active sites and a non-homogeneous result is obtained.

A substantially non-aqueous and substantially solvent-free system is used and there is no saturation of the substrate: thus there is no swelling, or only minimal swelling, of the fibres.

Using the process, good results can be obtained, both in terms of increased resistance to subsequent degradation by our test substance, aqueous sulphuric acid, and increased fold endurance (a measurement which we believe correlates with the results of general wear and tear). In fact significant increases in fold endurance have been obtained with a weight increase of the sheet of only about 20–25% based on fibre weight.

We have now found that the addition of multi-unsaturated comonomers, especially 1,6-hexanediol diacrylate, 1,6-hexanediol dimethacrylate and 1,4-butanediol dimethacrylate, can lead to even greater increases in fold endurance.

Thus, the present invention provides a process for the treatment of archival material, which comprises the radiation-induced polymerisation, within the paper, of a monomer mixture comprising (i) one or more mono-unsaturated (also called monofunctional) vinyl monomers selected from the esters of acrylic acid and the esters of α-lower alkyl-substituted acrylic acids, and (ii) one or more multi-unsaturated ("multi-functional") vinyl monomers, irradiation being carried out with γ-radiation or X-rays in the presence of the monomers, and the process being carried out in a substantially non-aqueous substantially solvent-free system.

The present invention also especially provides a process for the treatment of archival material, which comprises the radiation-induced polymerisation, within the paper, of a monomer mixture comprising (i) one or more mono-unsaturated ("monofunctional") vinyl monomers selected from the esters of acrylic acid and the esters of α-lower alkyl-substituted acrylic acids, and (ii) one or more multi-unsaturated ("multifunctional") vinyl monomers, irradiation being carried out with γ-radiation or X-rays in the presence of the monomers, and the process being carried out in a substantially non-aqueous system, the monomers being applied in bulk form by a non-immersion process in an amount of no more than 50% by weight of the archival material.

Especially also, the present invention provides a process for the treatment of archival material, which comprises the radiation-induced polymerisation, within the paper, of a monomer mixture comprising (i) a mono-unsaturated ("monofunctional") vinyl monomer component comprising an ester of acrylic acid or an ester of acrylic acid and an ester of an α-lower alkyl-substituted acrylic acid, and (ii) one or more multi-unsaturated ("multifunctional") vinyl monomers, irradiation being carried out with γ-radiation or X-rays in the presence of the monomers, and the process being carried out with minimum swelling of the fibres of the archival material.

The process may be applied to modern and aged material, containing, for example, textual, diagrammatical and/or pictorial matter.

The process is suitable for treating several items at the same time, for example sheets of paper touching one another. The paper may be, for example, in the form of individual sheets, for example maps, or groups of sheets, as for example in a newspaper. The process is suitable for bound volumes, for example of newspapers and/or magazines, or books, and batches of these can be treated together. Indeed, the ability to treat complete books without disbinding, and, further, to treat batches of books and manuscripts without the need for complete prior categorisation and segregation, which would be expensive and time-consuming, is of crucial significance to any preservation process. Thus, book bindings and covers must be capable of treatment with the rest of the book, and books of different ages and reactivities should ideally be capable of treatment together, without excessive deposition of polymer in the most reactive substrates at the expense of less active materials. Possible reduced polymer deposition in the unreactive substrates is not perhaps so important, since failure of reaction will not cause significant damage, but prevention of excessive deposition in the more reactive papers is crucial, since this could cause translucency and changes in the feel of the paper: in some cases bonding of pages together could even occur. However, we have found that, surprisingly, these disadvantages do not occur with the process of the present invention.

In contrast to certain prior art processes, by the process of the present invention we have surprisingly obtained a negligible change in sheet thickness, minimal damage to the print and to the covers or bindings. The latter is very surprising since the polymerisation reaction occurs in the liquid phase and liquid monomer is capable of weakening some binding adhesives.

Solvent extraction of archival material treated by the process of the present invention is likely to show that, as in the process of U.S. patent application Ser. No.

708,620, the polymer is inextricably linked with the fibre matrix. Although this would not be conclusive proof of grafting of polymer to matrix, it is generally considered that resistance to solvent extraction, coupled with improvement in the substrate's physical properties, is strong evidence in favour of grafting.

It is believed that examination of a treated substrate using visible and electron microscopy would show, as it did for the polymer produced by the process of U.S. patent application Ser. No. 708,620, that polymer is deposited within the substrate: throughout the fibre and also between the fibres, producing inter-fibre linking; this probably would account for both increased chemical resistance and fold endurance. It is likely also that the voids in the fibre matrix would not be completely filled with polymer. In contrast, microscopic examination of archival material treated by a solution polymerisation process showed that in such instances polymer is generally deposited in discrete particles on the surface of the fibres and within the fibre; no inter-fibre linking was seen and this process did not produce satisfactory improvement in fold endurance.

An article by Davis, Garnett et al. in Adv. in Chem. Ser. (ACS) No. 193, 1981 (Preserv. Paper and Textiles Symp. September 1979) 223-240 discloses a simultaneous irradiation process using UV and ionising radiation for grafting styrene and acrylates to cellulose. The technique described comprises total immersion of the cellulose sample in a monomer solution, ensuring maximum application to the monomer. This contrasts completely with that of the present invention. The article then suggests that a polymerisation process could be used for paper conservation purposes, but indicates that the simultaneous irradiation procedure described is only of limited value for paper preservation work since the process is time-consuming and requires solvent to achieve maximum efficiency in copolymerisation. In our process, in contrast, we have found that solvent is not required and, surprisingly, with a non-immersion and non-solvent process it is nevertheless possible to obtain excellent results by the simultaneous irradiation procedure with γ-rays or X-rays. The article then suggests that for paper preservation the process should involve solvent-free, rapid cure, UV and electron beam systems, but this is also different from the process of the present invention where the polymerisation is a grafting process initiated by γ-rays or X-rays.

In the process of the present invention, the polymerisation reaction occurs in the liquid phase on the substrate, and it is important to ensure penetration of the monomers into the substrate and homogeneity of the monomers on the substrate. It is surprising that with a non-saturation (controlled-feed) process and use of a substantially solvent-free system nevertheless good results can be achieved. The process of the present invention enables satisfactory improvement in strength to be achieved and, surprisingly, homogeneous polymerisation has been possible provided time is allowed for penetration of the monomers before the irradiation is begun.

It is also surprising that the process is suitable for bound volumes; "blocking" problems (sticking together of individual sheets) would be expected, but do not in fact occur with the process of the present invention.

The process may be carried out for example by spraying the monomers directly on to the substrate or by a wicking process, and then mechanical means, for example rotation of the vessel, may be used to ensure homogeneity before irradiation. To ensure really good homogeneity, it may be desirable to rotate the vessel during reaction. It is surprising that with application of bulk (or substantially undiluted) monomer and avoidance of saturation of the substrate it is nevertheless possible to achieve satisfactory penetration of the monomer into the substrate; that this can be achieved without unacceptable damage to ink and binding is even more surprising.

The process of the present invention involves the use of a multi-unsaturated vinyl monomer (also known as a multifunctional vinyl monomer), especially a multifunctional acrylate or methacrylate, or two or more such monomers in the polymerisation system. In other respects the process is substantially unchanged from that given in the above-mentioned U.S. patent application Ser. No. 708,620 (the text of which is hereby incorporated by reference), except that the liquid phase method for monomer delivery must be used. The multi-unsaturated (or multifunctional) component may act as a cross-linking agent within the formed polymer, producing a network structure. The gain in fold endurance so obtained is, for example, from 3 to 5 times that obtained when the cross-linker is omitted. An increase in overall yield is also observed.

By "multi-unsaturated" (or "multifunctional") vinyl monomer there is meant one that has two, three or more vinyl groupings; that is, it may be di-, tri- or higher-functional. Suitable multi-unsaturated vinyl monomers are, for example, those of the general formula in which R° represents a hydrogen atom or a lower alkyl radical, e.g. ethyl or, preferably, methyl, n represents an integer from 1 to 16, and p represents an integer from 2 to 4.

Examples of suitable multifunctional monomers include 1,6-hexanediol diacrylate, 1,6-hexanediol dimethacrylate, 1,4-butanediol diacrylate, 1,4-butanediol dimethacrylate, triethylene glycol dimethacrylate, neopentyl glycol diacrylate, trimethylolpropane trimethacrylate, trimethylolpropane triacrylate and pentaerythritol triacrylate.

Preferably, the multifunctional comonomer makes up no more than 2%, more especially no more than 1%, by weight of the total monomer mixture; an amount of, for example, 0.2% by weight of the mixture has been found to give excellent results.

Suitable mono-unsaturated vinyl monomers (also known as monofunctional vinyl monomers) for use in a process of the present invention may be, for example, those of the general formula $$CH_2=CR°-COOR \qquad I$$

in which
R° has the meaning given above, and
R represents
(i) a group of the general formula in which
n has the meaning given above, and
X represents OH, a halogen atom or an unsubstituted or mono- or di-lower alkyl-substituted amino group, or
(ii) a group of the general formula $-CH_2C_mH_{2m-1}$ in which m represents an integer from 2 to 15, or
(iii) a group of the general formula $-C_{n°}H_{2n°}-Y$ where
n° represents 0 or an integer from 1 to 16 and
Y represents a phenyl group or a ($C_5$-$C_7$)—cycloalkyl radical, each of which is unsubstituted or substituted by one or more alkyl radicals having up to 16 carbon atoms in the alkyl moiety or moieties, e.g. benzyl, phenyl, tolyl or cyclohexyl.

A $C_nH_{2n+1}$, $C_nH_{2n}$, $C_mH_{2m-1}$, or $C_{n°}H_{2n°}$ radical or a lower alkyl radical or an alkyl radical in a group represented by Y may be a straight- or branched-chain group.

The hydroxy group or amino radical in a $C_nH_{2n}X$ radical is preferably in the ω-position.

A halogen atom represented by X is especially a fluorine, chlorine or bromine atom.

It should be understood that the term "lower" used herein in connection with lower alkyl radicals represented for example by R° or in a radical represented by R denotes such groups that have from 1 to 4 carbon atoms. Preferably, in a $C_nH_{2n+1}$, $C_nH_{2n}X$, or $CH_2C_mH_{2m-1}$ radical there is a maximum of 8 carbon atoms, and in a $C_{n°}H_{2n°}$ radical or an alkyl substituent of Y there is preferably a maximum of 4 carbon atoms.

Examples of some preferred compounds which may be used in the process of the present invention are Acrylates: methyl, ethyl, propyl, isopropyl, butyl, amyl, hexyl, heptyl, isobutyl, s-butyl, t-butyl, 2-methyl-1-butyl, 3-methyl-1-butyl, 3-pentyl, 2-methyl-1-pentyl, neopentyl, 2-ethyl-1-butyl, 4-methyl-2-pentyl, 2-heptyl, 2-ethylhexyl and 2-hydroxyethyl Methacrylates: methyl, ethyl, butyl, cyclohexyl, 2-hydroxyethyl, allyl, and 2-(dimethylamino)-ethyl.

The monofunctional monomer component may comprise a single monomer or two or more monomers; similarly, the multifunctional monomer component may comprise a single monomer or two or more monomers. Mixing of two or more of the monomers, including, for example, the monofunctional and multifunctional components may, if desired, be carried out prior to treatment of the substrate, but this is not essential, provided of course irradiation is carried out after application to the substrate, i.e. in the presence of all monomers.

Factors which determine monomer selection include
(a) ultimate sheet strength, as measured by fold endurance, and
(b) polymer yield.

As regards fold endurance, we have found that brittle polymers, e.g. polymers of methyl methacrylate or vinylidene chloride, tend to produce little or no increase in fold endurance.

As regards yield, it should be noted that the phenolic structure of lignin and similar wood components can inhibit the radiation-induced free-radical polymerisation of most common monomers. Some inhibition of polymerisation might therefore be expected in our system when lignin-containing papers are treated, and an inhibition mechanism involving phenolic residues and molecular oxygen is possible. We have, in fact, found that when ethyl acrylate is used as the sole monofunctional monomer different yields are obtained with different papers generally in the sequence:

Modern cotton>modern mechanical>aged cotton->aged news.

When yields are reduced there is a concurrent increase in polymer deposition on the wall of the reaction vessel, suggesting that the rate of polymerisation of monomer on the reactor surface and in the vapour is substantially greater than that in the paper. The impregnated substrate then merely acts as a reservoir of monomer rather than the locus of reaction itself.

Examination of the literature, however, has not yielded any relevant information concerning possible changes that occur in cellulose over extended periods of exposure to the atmosphere. Indeed, there has been no previous work at all on grafting to aged substrates.

We have found that with some papers improved yields can be obtained when there was a repeat addition of monofunctional monomer and irradiation, and also when combinations of different monofunctional monomers are used: a synergistic effect is observable.

For example, small quantities of methyl methacrylate added to the ethyl acrylate proved especially useful. The addition of, for example, butyl methacrylate to ethyl acrylate also resulted in a substantial increase in polymer yield and large increases in yield were also obtained, for example, with mixtures of methyl acrylate and methyl or butyl methacrylate as the monofunctional component. The increase in yield with aged papers cannot be accounted for simply by independent polymerisation of the second monofunctional monomer: the yield improvement so obtained was in excess of that which could be obtained from the addition of the methacrylate component alone. Concurrent with this increase was a reduction in the amount of polymeric material deposited on the reaction vessel walls. The evidence suggests that some synergistic effect is in operation.

Accordingly, the present invention provides a process for the treatment of archival material, which comprises the radiation-induced polymerisation, within the paper, of a monomer mixture comprising (i) a mono-unsaturated ("monofunctional") vinyl monomer component comprising
  (a) an acrylic acid ester or an ester of an α-lower alkyl-substituted acrylic acid, and
  (b) a comonomer which provides an improvement in yield per unit dose of radiation and which is an acrylic acid ester or an ester of an α-lower alkyl-substituted acrylic acid, and
(ii) one or more multi-unsaturated ("multifunctional") vinyl monomers, irradiation being carried out with γ-radiation or X-rays in the presence of the monomers, and the process being carried out with substantially no swelling of the fibres of the archival material.

The major component of the monofunctional monomer component may comprise, for example, ethyl acrylate or related monomer of the general formula $CH_2=CH-COOR'$ where R' represents a group of the general formula $C_{n'}H_{2n'+1}$ or $C_{n'}H_{2n'}OH$ in which n' represents an integer from 1 to 10, preferably from 2 to 10, and more especially R' represents a ($C_2$-$C_8$)-alkyl radical.

The minor component, which acts as yield enhancer, may comprise, for example, methyl methacrylate or related monomer of the general formula $$CH_2=CR^2-COOR''$$

in which
R" represents
(i) a group of the general formula $$C_nH_{2n+1} \text{ or } C_nH_{2n}X$$

preferably a ($C_1$–$C_8$)-alkyl radical, or
(ii) a group of the general formula $$-CH_2C_mH_{2m-1}$$

in which
n, X and m have the meanings given above, and
$R^2$ represents a lower alkyl radical, e.g. ethyl or, preferably, methyl.

The present invention especially provides a process for the treatment of archival material, which comprises the radiation-induced polymerisation, within the paper, of a monomer mixture comprising
(i) a mono-unsaturated (monofunctional) vinyl monomer component comprising
(a) as major component an acrylic acid ester of the general formula $$CH_2=CH-COOR'$$

where R' represents a group of the general formula $C_{n'}H_{2n'+1}$ or $C_{n'}H_{2n'}OH$ in which n' represents an integer from 1 to 10; and
(b) as minor component an ester of an α-lower alkyl-substituted acrylic acid of the general formula $$CH_2=CR^2-COOR''$$

in which
R" represents a group of the general formula $$-C_nH_{2n+1}, -C_nH_{2n}X, \text{ or } -CH_2C_mH_{2m-1}$$

in which n represents an integer from 1 to 16,
X represents OH, a halogen atom or an unsubstituted or mono- or di-lower alkyl-substituted amino group, and
m represents an integer from 2 to 15, and
$R^2$ represents a lower alkyl radical, and
(ii) one or more multi-unsaturated (multifunctional) vinyl monomers, irradiation being carried out with γ-radiation or X-rays in the presence of the monomers, and the process being carried out in a substantially non-aqueous substantially solvent-free system and with the avoidance of saturation of the archival material.

Successful combinations of major and minor monofunctional monomer components include, for example, methyl acrylate and methyl methacrylate ethyl acrylate and methyl methacrylate butyl acrylate and methyl methacrylate 2-ethylhexyl acrylate and methyl methacrylate ethyl acrylate and ethyl methacrylate methyl acrylate and butyl methacrylate ethyl acrylate and butyl methacrylate.

The present invention more especially provides a process for the treatment of archival material, which comprises radiation-induced polymerisation of ethyl acrylate within the paper in the presence of butyl or methyl methacrylate and a multifunctional acrylate or methacrylate or two or more such multifunctional monomers, irradiation being carried out with γ-radiation or X-rays in the presence of the three or more monomers and the process being carried out in a substantially non-aqueous substantially solvent-free system.

It should of course be understood that although we have referred only to the polymerisation of the ethyl acrylate component, since a methacrylate and a multifunctional comonomer are also present some of these are also incorporated in the resulting polymer. We use the term "polymer" herein to include copolymers.

The achievement of suitable polymer yield must, however, be balanced with the achievement of suitable increase in fold endurance of the treated sheets and this may influence the choice of monomers and/or their proportions; the selection will depend inter alia on the particular substrate to be treated.

As monofunctional monomer component there should especially be mentioned a mixture of ethyl acrylate and methyl or butyl methacrylate used, for example, in a weight ratio of ethyl acrylate to methyl methacrylate of from 20:1 to 1:1, preferably from 3:1 to 5:1, more especially 5:1, or of ethyl acrylate to butyl methacrylate of from 2:1 to 1:2, more especially 1:1.

There should especially be mentioned the following mixtures of monomers:
ethyl acrylate:methyl methacrylate:hexanediol diacrylate 5:1:0.01;
ethyl acrylate:butyl methacrylate:hexanediol diacrylate 1:1:0.0033.

Another highly effective means for improving yield comprises application of monomer and irradiation, after which application of further monomer and further irradiation brings about the substantive protective polymerisation reaction.

Accordingly, the present invention provides a process for the treatment of archival material, which comprises the radiation-induced polymerisation, within the paper, of a monomer mixture comprising
(i) one or more mono-unsaturated (monofunctional) vinyl monomers selected from the esters of acrylic acid and the esters of α-lower alkyl-substituted acrylic acids, and
(ii) one or more multi-unsaturated (multifunctional) vinyl monomers,
wherein repeated treatment is used, irradiation being carried out with γ-radiation or X-rays after each addition of mono-unsaturated monomer component, and the process being carried out with substantially no swelling of the fibres of the archival material.

The further monofunctional vinyl monomer may be the same or a different monomer; for example ethyl acrylate may be used in each step. The amount of monofunctional monomer added in the first step may be, for example, the same as in the second step or, in many instances, less; for example ≦20% by weight of the total monofunctional monomer addition may be made in the first step. The multifunctional monomer component may be added in any one or more of the steps, but is probably only needed for the final step.

We have also found that polymerisation of a high boiling monomer as sole monofunctional monomer component gave excellent polymer yields. Since, we believe, reduced polymerisation yields on the substrate are a result of competition between polymerisation reactions in th substrate and out of it, the increased yield with high boiling monomers can probably be attributed to the fact that the vapour pressure of the monomer (which is a function of the boiling point) is sufficiently low that there is considerably reduced transfer of monomer from the substrate into the atmosphere of the vessel and correspondingly reduced polymerisation in the atmosphere and on the vessel wall.

Accordingly, the present invention provides a process for the treatment of archival material, which comprises the radiation-induced polymerisation, within the paper, of a monomer mixture comprising (i) one or more mono-unsaturated (monofunctional) vinyl monomers selected from the esters of acrylic acid and the esters of α-lower alkyl-substituted acrylic acids, and (ii) one or more multi-unsaturated (multifunctional) vinyl monomers, irradiation being carried out with γ-radiation or X-rays in the presence of the monomers, and wherein the vapour pressure of the monomer mixture at the temperature and pressure of the reaction is such that there is no substantial transfer of monomer from the paper, and the process is carried out with substantially no swelling of the fibres of the archival material.

Accordingly, the present invention provides a process for the treatment of archival material, which comprises the radiation-induced polymerisation, within the paper, of a monomer mixture comprising (i) one or more mono-unsaturated vinyl monomers selected from the esters of acrylic acid and the esters of α-lower alkyl-substituted acrylic acids, and (ii) one or more multi-unsaturated vinyl monomers, irradiation being carried out with γ-radiation or X-rays in the presence of the monomers, and the process being carried out in a substantially non-aqueous substantially solvent-free system, the vapour pressure of the monomer mixture at the temperature and pressure of the reaction being such that the increase in weight of the paper corresponds to a polymerisation yield of at least 55%, preferably at least 60%.

Where normal temperature and pressure are used for the reaction, and a single monofunctional monomer is used with no repeat of the process, the use of a monofunctional monomer having a boiling point of $\geq 130°$ C., more especially $\geq 150°$ C., at atmospheric pressure should especially be mentioned. An example is 2-ethylhexyl acrylate.

Other methods of increasing the efficiency of polymer deposition include:

(a) addition of a non-polymerisable compound as scavenger of inhibitor;

(b) addition of a substance to increase the rate of initiation, for example chloroform or carbon tetrachloride;

(c) chemical conversion of the inhibitor.

Impregnation of sample sheets of aged paper with tetrakis(hydroxymethyl)phosphonium chloride (THPC) (which is a compound which reacts with oxygen) produces a significant increase in polymer yield. Moreover, the polymer yield is dependent upon the concentration of THPC present.

The addition of chloroform or carbon tetrachloride (~5% by weight on a.d. (i.e. air dried) fibre) which are also solvents for ethyl acrylate and swelling agents for the polymer, would also give significantly increased polymer yields. However, whilst this method is effective with mechanical paper substrates, it is not apparently applicable to all substrates, aged esparto being particularly unresponsive; moreover the process of the present invention should generally be carried out in a substantially solvent-free system and/or such that there is substantially no swelling of the fibers.

Pre-irradiation prior to impregnation with monomer, particularly in the presence of chloroform or carbon tetrachloride, and subsequent reirradiation, has produced up to a 3-fold increase in yield. (If inhibition is due to oxygen, pre-irradiation should convert this to cellulose-peroxides.) The effectiveness of the treatment increases with increasing dose. However, this treatment was carried out by degassing the substrate, preirradiating in the presence of chloroform (for example 5% by weight chloroform $+0.4$ to $0.48$ MRad), impregnating with monomer followed by a second irradiation step (for example 0.15 to 0.2 MRad), and, whilst yields were attractively increased, the process has two major disadvantages, namely the use of chloroform and the two-step irradiation procedure.

For improving the efficiency of polymer deposition, one or more of the various means described above may be used, provided there is no substantial use of solvent or there is minimum swelling of the fibres.

Removal of inhibitor by physical means such as degassing may also be used, but produces marginal improvement in polymer yield. Extraction of aged samples with particular solvents (e.g. degassed methanol) and subsequent irradiation after impregnation with monomer would also give increased yields in some instances, but should not be carried out on the archival material.

The deposition of acid-resistant polymer by the process of the present invention has been shown to provide resistance to attack by acid solutions, including resistance to internal attack by acid already present.

The inclusion of a basic monomer in the polymerisation step may be useful in providing, if required, additional resistance to internal attack. Amine-substituted alkyl methacrylate monomers, for example, are suitable, more especially 2-(dimethylamino)ethyl methacrylate. The amine monomer is readily polymerised by γ-radiation, and it is a sufficiently strong base that little needs to be incorporated in the monomer charge to effect complete neutralisation; indeed, in general, only small amounts should be used since large amounts may have a deleterious effect on strength. For example, the amine may be from 0.1 5% by weight of the total monomer mixture (including the amine). Paper samples impregnated with acid to a pH of 4.0 have been adequately treated with a monomer mixture of ethyl acrylate:methyl methacrylate:amino-substituted monomer of 5:1:0.1 by weight, yielding 15% polymer and a resulting alkaline substrate, and the same ratio of these three mono-unsaturated monomers may be used when the multi-unsaturated monomer component is also present. Strength improvements are not impaired at this level of amine addition.

Other monomers which might theoretically be used in the process of the present invention are, for example, acrylonitrile, acrylamide, vinylidene chloride, vinyl chloride and vinyl pyridine. Acrylonitrile, acrylamide and vinyl chloride are toxic and/or carcinogenic, however. We have found that both isoprene and vinylidene chloride tend to disrupt any existing fibre-fibre bonding. Moreover, vinylidene chloride gives brittle polymers, lacking in strength; it does however impart good acid resistance and so may be useful in combination with other monomer(s). Similarly, vinyl chloride would present problems if used on its own, as its homopolymer is unstable, the by-product of its "unzipping" being HCl.

The major proportion of the monomer mixture should, however, be the acrylate and/or α-lower alkyl-substituted acrylate component; indeed, the mixture should preferably consist essentially of the mono-unsaturated acrylate and/or α-lower alkyl-substituted acrylate component and the multi-unsaturated vinyl component.

For book consolidation strength gain is important and therefore highly non-polar monomers such as styrene, isoprene and butadiene are to be avoided or used only in small quantities; these appear to have poor compatibility with the cellulose itself.

The temperature selected for the process is influenced by the material treated. To avoid damage to book bindings the upper limit should generally be 40°-50° C. Similarly, although temperatures as low as minus 90° C. have been used for polymerisation, in practice temperatures low enough to freeze the water in any binding should be avoided. Moreover, at such low temperatures the homogeneity of the product is very poor and there is some surface deposition on the paper. Thus, the process may be carried out for example at a temperature in the range of from 5° to 50° C., preferably no more than 40° C., more especially at ambient temperature.

Pressure is generally atmospheric pressure but elevated or reduced pressure are possible.

However, the pressure and temperature selected can influence yield, and this factor may have a strong influence on the choice of conditions used. Thus, to improve yield, the reaction may be carried out at reduced temperature or elevated pressure although, in the latter case, in order to assist the transfer of monomer into the substrate, a lower pressure, e.g. reduced or atmospheric pressure, may be used during introduction of the monomers.

γ-rays are suitably used as initiator, although X-rays may also be possible. We have found both total dose and the rate at which it is supplied are important and have an effect on yield. Maximising the yields of grafted polymer obtained is desirable, not only to reduce the consumption of monomer and the deposition of polymer on the reaction vessels, but also in minimise or eliminate problems which might arise from the presence of residual monomers. At doses above 2.0 MRad radiation damage to cellulose becomes appreciable. High dose rates—1.0 MRad/hour and above—also have disadvantages: the total dose required for a given yield in increased, while the strength enhancement obtained is reduced. At the same time a certain total dose is needed to minimise residual monomer, while high dose rates are, of course, convenient from an operating standpoint. A compromise is therefore necessary. Thus, suitable radiation doses for the (or each) irradiation step are, for example, in the range of from 0.1 to 1.5 MRad, preferably at least 0.2 MRad, more especially 0.4 to 1.0 MRad, and suitable radiation dose rates are, for example, 0.4 to 0.02 MRad/hour. Where the process is repeated, the same or different dose and/or dose rate may be used in the two steps; satisfactory yields have been obtained with, for example, 0.4 to 0.48 MRad in the first step and a lower dose in the second step.

Using the mixed monofunctional monomer method, we have found that for the same total dose of radiation and approximately the same polymer addition, increases in fold endurance for aged substrates treated with polymer at two different dose rates (0.03 and 0.3 MRad $hr^{-1}$) were greater with the higher radiation dose rate.

The total monomer addition is, for example, from 15 to 50%, preferably 25 to 35%, more especially 20 to 30%, of the fibre weight. Especially, there should be mentioned the use of 15 to 50%, preferably 15 to 25%, more especially 20% to 30%, of the weight of the archival material.

Increases in weight of the paper comprising the archival material due to polymer deposition of for example from 5 to 40%, especially 10 to 40%, preferably 15 to 25%, more especially 20%, have been achieved and given good results.

By the process of the present invention the effect of acid-catalysed degradation of the cellulose can be substantially reduced and some of the original paper strength can be recovered.

Furthermore, the present process employs low doses of radiation and large improvements in sheet strengths, as measured by fold endurance tests, are obtained with low addition of polymer. However, we believe that when the untreated substrate has a fold endurance below about 15 or 20, satisfactory improvement in fold endurance cannot be guaranteed, even with good polymer yields. It seem likely that below a threshold fibre length, the fibre network is sufficiently impaired that addition of polymer has little effect.

Microscopic study of cross-sections of treated samples indicates clearly that no significant variation in sheet thickness occurs for a range of different paper samples and fibre types. This is a consequence of the use of a substantially non-aqueous system (generally also substantially solvent-free) and contrasts with processes involving the use of a cosolvent which would also act as swelling agent for the fibre. (Generally, the process of the present invention uses a substantially solvent-free system.) Niether is the mode of polymer deposition akin to lamination or U.V.-initiated surface deposition where measurable changes in sheet thickness might be expected, and do occur: the interaction of polymer and fibre is much more intimate in γ-initiated mutual polymerisation.

Thus, the process of the invention provides, for the first time, a practical method of treating lignin-containing fibres under mild conditions.

Development work has shown that the process of the present invention can be applied routinely to cross-sections of books and, indeed, complete books. The process also has the advantage that there is minimum discolouration and no noticeably different surface texture.

Unless the context indicates otherwise, when used herein in the Examples below and elsewhere in the specification, the term "total addition" or "monomer addition" refers to the weight of monomers added compared with the weight of the substrate; the terms "weight increase" and "sheet weight gain" refer to the increase in weight of the substrate after treatment compared with the weight of the substrate before treatment; and the term "yield" refers to the increase in weight of the substrate compared with the total addition of monomers. These terms are expressed as a percentage.

The following Examples illustrate the invention. All percentages and ratios given are by weight.

Method

Paper samples—a minimum of 24 sheets held together—were weighted and placed in a reaction vessel and degassed at reduced pressure. A nitrogen atmosphere was then established in the vessel. The monomers used, degassed, distilled under vacuum and purged with nitrogen prior to use, were squirted onto the samples. The impregnated samples were then conditioned for 12 hr or more on a rotating drum to ensure homogeneity of monomers within the sheet, and the samples were subsequently irradiated in a cobalt 60 source to effect the polymerisation. The pressure in the reaction vessel during irradiation was atmospheric and the temperature 20° C.

The treated material was then removed from the reaction vessel and allowed to equilibrate until air dry. For testing, the material was transferred to constant temperature and constant humidity chamber (23° C.±1° C. at 50%±2% RH).

Measurements and tests were carried out as follows:
1. Percent weight increase and polymer yield The samples were weighted and the percentage weight increase in the samples calculated. From the weight increase and the known weight of monomers used, the percentage polymer yield was calculated.

2. Fold Endurance

Fold endurance tests were carried out according to the method of ASTM D 685/73 D 2176 using an MIT tester. The paper samples are folded repeatedly under constant tension (0.5 kg load) and at a constant rate until they break, the number of folds required being taken as a measure of sample strength.

An evaluation of this test as a means of measuring strength is given by R. Cardwell, L. Lyon and P. Luner in *Tappi*, 1972, 55 (2), 228.

It is difficult to give exact figures for "satisfactory" or "unsatisfactory" fold endurance values or increases, since these are relative to the initial fold endurance value. For example, if the initial value is 20, and increase to ~100 would be a vast improvement, but if the initial value is ~100, the same absolute increase would represent less of an improvement. The aim of course is to increase fold endurance, so even small increases are beneficial, although a final fold endurance of ≦20 would not be satisfactory. Preferably, the final fold endurance should be ≧40, especially ≧60, and more especially ≧80, and very especially ≧100–150. Preferably the increase should be ≧2 fold, especially ≧3 fold, more especially ≧4 fold.

The following symbols are used:
EA: ethyl acrylate
MMA: methyl methacrylate
HDD: 1,6-hexanediol diacrylate
TPT: trimethylolpropane trimethacrylate
TPTA: trimethylolpropane triacrylate
BDDM: 1,4-butanediol dimethacrylate
HDDM: 1,6-hexanediol dimethacrylate
AM: 2-(dimethylamino)ethyl methacrylate
FE: fold endurance Example 1

A modern mechanical paper substrate (Richard Clay newsprint) having a FE of 185 was treated as described above with an EA/MMA monomer mixture containing HDD (15% monomer addition) and polymerised using a radiation dose of 0.48 MRad at a dose rate of 0.026 MRad/hr. The test was repeated with the HDD omitted. The results were as follows:

TABLE 1

| Monomer mixture | % Weight gain | % Yield | Final FE |
|---|---|---|---|
| EA:MMA:HDD 5:1:0.01 | 12.5 | 81 | 945 |
| EA:MMA 5:1 | 12.7 | 75 | 310 |

Good PE figures and yields were obtained in both experiments, but results were superior with the HDD-containing mixture.

Example 2

The test of Example 1 was repeated using an aged mechanical paper substrate (original FE 21). The results were as follows:

TABLE 2

| Monomer mixture | % Weight gain | % Yield | Final FE |
|---|---|---|---|
| EA:MMA:HDD 5:1:0.01 | 12.5 | 82 | 342 |
| EA:MMA 5:1 | 12.2 | 76 | 87 |

Good PE figures and yields were obtained in both experiments, but results were superior with the HDD-containing mixture.

Example 3

Paper samples from paperback books dated 1956 to 1980 were treated as described above with a monomer mixture containing polyfunctional monomer and basic monomer (the mixture EA:MMA:AM:HDD (5:1:0.1:0.01)) using undistilled but degassed monomers at 20% addition and a dose of 1.0 MRad and a dose of 0.021 MRad/hr. Weight gain was measured and average yield calculated. Fold endurance values were measured before and after treatment. The results were as follows:

TABLE 3

| substrate | Date | % wt. Incr. | Av. % Yield | F.E. |
|---|---|---|---|---|
| Book 21A | 1956 | 14.0 | 74 | 233[58] |
|  |  | 15.6 |  |  |
| Book 22A | 1963 | 14.9 | 77 | 354[34] |
|  |  | 15.8 |  |  |
|  |  | 15.6 |  |  |
| Book 16A | 1968 | 15.4 | 75 | 369[105] |
|  |  | 14.5 |  |  |
|  |  | 15.3 |  |  |
| Book 23A | 1970 | 12.6 | 59 |  |
|  |  | 12.7 |  |  |
|  |  | 10.2 |  |  |
| Book 46A | 1972 | 12.2 | 61 |  |
| Book 109B | 1973 | 16.0 | 80 |  |
| Book 53A | 1975 | 11.4 | 60 |  |
|  |  | 13.3 |  |  |
|  |  | 11.4 |  |  |
| Book 13A | 1976 | 14.4 | 74 | 795[304] |
|  |  | 15.2 |  |  |
|  |  | 14.6 |  |  |
| Book 62A | 1978 | 11.3 | 55 |  |
|  |  | 11.2 |  |  |
|  |  | 10.4 |  |  |
| Book 58A | 1980 | 9.7 | 48 |  |
|  |  | 12.2 |  |  |
|  |  | 7.1 |  |  |
| Book 109B | 1980 | 13.1 | 65 |  |

[ ]original fold value

The results clearly show that the monomer mixture gave good yields in most cases and fold endurance values increased.

Example 4

The effect of a monomer mixture containing both polyfunctional monomer and basic monomer was investigated using BDDM as the polyfunctional monomer, a pure cotton substrate, a dose of 0.6 MRad, a dose of 0.022 MRad/hr and 20% monomer addition. The results were as follows:

TABLE 4

| Substrate | % weight incr. | % Yield |
|---|---|---|
| Whatmans | 16.2 | 81 |
| Book A | 15.6 | 78 |
| (aged rag) (1675) | | |

Good yields were obtained.

Example 5

The effect of different % monomer additions and different monomer mixtures on various substrates was investigated. HDD and HDDM were used as polyfunctional monomers. Different proportions of polyfunctional monomer were also tested. The experimental conditions and results are given in Table 5 below. Except where indicated the monomers were undistilled, unwashed and degassed.

TABLE 5

| Substrate | Conditions | Dose MRad | % Monomer addition | % wt. incr. | % Yield | F.E. |
|---|---|---|---|---|---|---|
| RC news | EA:MMA 5:1 | 0.6 | 10 | 5.7 | 57 | 661[499] |
| | | | 20 | 13.6 | 68 | 2354 |
| | | | 30 | 25.3 | 84 | 1148 |
| | | | 40 | 34.9 | 87 | 1507 |
| RC news | EA:MMA:HDD 5:1:0.1 | 0.6 | 10 | 7.2 | 72 | 1004 |
| | | | 20 | 16.6 | 83 | 773 |
| | | | 30 | 25.7 | 86 | 1308 |
| | | | 40 | 37.1 | 93 | 1266 |
| RC news | EA:MMA:HDD 5:1:0.005 | 0.6 | 10 | 6.2 | 62 | 754 |
| | | | 20 | 15.8 | 79 | 595 |
| | | | 30 | 26.3 | 88 | 850 |
| | | | 40 | 35.5 | 89 | 894 |
| RC news | EA:MMA:HDD 5:1:0.01 (distilled monomers) | 0.6 | 10 | 4.5 | 45 | 492 |
| | | | 20 | 15.6 | 78 | 795 |
| | | | 30 | 24.5 | 82 | 1035 |
| | | | 40 | 33.3 | 83 | 1699 |
| RC news | EA:MMA:HDD 5:1:0.01 | 0.6 | 10 | 5.4 | 54 | 508 |
| | | | 20 | 13.9 | 70 | 1117 |
| | | | 30 | 23.7 | 79 | — |
| | | | 40 | 34.4 | 86 | 1234 |
| RC news | EA:MMA:HDD 5:1:0.005 | 0.6 | 10 | 3.6 | 36 | |
| | | | 20 | 14.7 | 73 | 3025 |
| | | | 30 | 24.3 | 81 | 1293 |
| | | | 40 | 34.4 | 86 | 2033 |
| Book 107B | EA:MMA 5:1 | 0.6 | 10 | 3.4 | 34 | — |
| | | | 30 | 10.5 | 35 | — |
| | | | 40 | 24.5 | 61 | 1424[130] |
| Book 107B | EA:MMA:HDD 5:1:0.1 | 0.6 | 10 | 7.1 | 71 | 246 |
| | | | 20 | 17.3 | 86 | 234 |
| | | | 30 | 25.0 | 83 | 376 |
| | | | 40 | 35.4 | 89 | 995 |
| Book 107B | EA:MMA:HDD 5:1:0.005 | 0.6 | 10 | 3.6 | 36 | 410 |
| | | | 20 | 16.2 | 81 | 349 |
| | | | 40 | 35.9 | 90 | 284 |
| Book 107B | EA:MMA:HDD 5:1:0.01 (distilled monomers) | 0.6 | 10 | 3.0 | 30 | 202[130] |
| | | | 20 | 13.1 | 65 | 430 |
| | | | 30 | 21.8 | 73 | 696 |
| Book 107B | EA:MMA:HDD 5:1:0.01 | 0.6 | 10 | 1.1 | 11 | |
| | | | 20 | 9.9 | 49 | 447 |
| | | | 40 | 31.9 | 80 | 836 |
| Book 107B | EA:MMA:HDD 5:1:0.005 | 0.6 | 10 | 0.5 | 5 | — |
| | | | 40 | 29.7 | 74 | 771 |
| RC news | EA:MMA:HDDM 5:1:0.1 | 0.6 | 10 | 3.5 | 35 | 572 |
| | | | 20 | 15.2 | 76 | 1946 |
| | | | 30 | 25.0 | 83 | 1359 |
| | | | 40 | 34.1 | 85 | 1271 |
| RC news | EA:MMA:HDDM 5:1:0.05 | 0.97 | 10 | 3.5 | 35 | — |
| | | | 20 | 15.4 | 77 | — |
| | | | 30 | 19.6 | 65 | — |
| | | | 40 | 30.0 | 75 | 927 |
| RC news | EA:MMA:HDDM 5:1:0.01 (distilled monomers) | 0.97 | 10 | 2.7 | 27 | — |
| | | | 20 | 12.0 | 60 | 1156 |
| | | | 30 | 26.0 | 87 | — |
| | | | 40 | 30.0 | 75 | 2448 |
| RC news | EA:MMA:HDDM 5:1:0.01 | 0.9 | 10 | 3.2 | 32 | — |
| | | | 20* | 16.2 | 80 | — |
| | | | | 14.3 | 71 | 1303 |
| | | | 30 | 25.9 | 86 | — |

TABLE 5-continued

| Substrate | Conditions | Dose MRad | % Monomer addition | % wt. incr. | % Yield | F.E. |
|---|---|---|---|---|---|---|
| | | | 40 | 34.1 | 85 | 1781 |
| RC news | EA:MMA:HDDM 5:1:0.005 | 0.9 | 10 | 3.3 | 33 | — |
| | | | 20 | 15.2 | 76 | 1653 |
| | | | 30 | 26.1 | 87 | 1102 |
| | | | 40 | 36.0 | 90 | 2010 |
| Book 107b | EA:MMA:HDDM 5:1:0.1 | 0.6 | 10 | 4.3 | 43 | 188[130] |
| | | | 20 | 14.4 | 72 | 508 |
| | | | 30 | 25.0 | 83 | 409 |
| | | | 40 | 33.8 | 85 | — |
| Book 107B | EA:MMA:HDDM 5:1:0.05 | 0.97 | 10 | 2.6 | 26 | — |
| | | | 20 | 11.9 | 59 | 508 |
| | | | 30 | 20.9 | 70 | 405 |
| | | | 40 | 30.9 | 77 | 886 |
| Book 107B | EA:MAA:HDDM 5:1:0.01 (distilled monomers) | 0.97 | 20 | 12.8 | 64 | 560 |
| | | | 30 | 19.9 | 66 | 581 |
| | | | 40 | 29.4 | 74 | 666 |
| Book 107B | EA:MMA:HDDM 5:1:0.01 | | 10 | 2.9 | 29 | — |
| | | | 20 | 12.4 | 62 | 564 |
| | | | 30 | 17.9 | 60 | 1451 |
| | | | 40 | 28.1 | 70 | — |
| Book 107B | EA:MMA:HDDM 5:1:0.005 | | 10 | 3.9 | 39 | — |
| | | | 20 | 13.3 | 66 | 368 |
| | | | 30 | 19.1 | 64 | 823 |

Book 107B - aged mechanical
[ ]original fold value

The results obtained suggest that it may be possible to use as little as 0.1% HDD or HDDM in the monomer mixture and still get significant increases over the usual mixture in strength at constant weight increase.

Example 6

Tests were carried out as described above using DDM as the polyfunctional monomer with 20% monomer addition, 0.022 MRad/hr dose and 0.95 MRad total dose. The results were as follows:

TABLE 6

| substrate | conditions | % wt. incr. | % yield | F.E. |
|---|---|---|---|---|
| whatmans | EA | 13.6 | 68 | 2939[71] |
| | EA:MMA 5:1 | 17.5 | 88 | 3223 |
| | EA:MMA:AM 5:1:0.1 | 17.3 | 87 | 3227 |
| | EA:MMA:AM:HDDM 5:1:0.1:0.01 | 16.6 | 83 | |
| | EA:HDDM 5:0.1 | 17.4 | 87 | 1856 |
| Book A (rag) | EA | 8.8 | 44 | 424[30] |
| | EA:MMA 5:1 | 16.0 | 80 | 582 |
| | EA:MMA:AM:HDDM 5:1:0.1:0.01 | 16.4 | 82 | 421 |
| | EA:HDDM 5:0.1 | 13.7 | 68 | 180 |
| RC news | EA | 4.4 | 22 | 540[499] |
| | EA:MMA 5:1 | 13.1 | 66 | 555 |
| | EA:MMA:AM 5:1:0.1 | 11.8 | 59 | 1104 |
| | EA:MMA:AM:HDDM 5:1:0.1:0.01 | 14.6 | 73 | |
| | EA:HDDM 5:0.1 | 12.3 | 61 | 417 |
| Book 105B (mechan.) | EA | 3.0 | 15 | |
| | EA:MMA 5:1 | 11.3 | 56 | 245[38] |
| | EA:MMA:AM 5:1:0.1 | 11.3 | 56 | 205 |
| | EA:MMA:AM:HDDM 5:1:0.1:0.01 | 12.6 | 63 | 265 |
| | EA:HDDM 5:0.1 | 7.4 | 37 | 65 |

Example 7

The effect of different monomer mixtures on samples printed with ink containing toners and their dependence on the preconditioning time were studied. Details are given in Table 7 below.

TABLE 7
DEPENDENCE OF INK TONER MOVEMENT ON MONOMER MIXTURE AND PRECONDITIONING PERIOD (0.5 MRad at 0.025 MRad hr$^{-1}$)

| Monomer mixture | Average % weight incr. | Average % yield | Toner movement |
|---|---|---|---|
| EA:MMA 5:1 | 15.6 | 78 | 2 after 17 hr. |
| EA:MMA:AM 5:1:0.1 | 16.1 | 80 | 2 after 24 hr |
| EA:MMA:HDD 5:1:0.01 | 17.1 | 86 | 2 after 17 hr |
| EA:MAA:AM:HDD 5:1:0.1:0.01 | 17.5 | 88 | 1 after 36 hr |
| EA:BMA 1:1 | 18.3 | 92 | 2 after 17 hr |
| EA:BMA:AM 1:1:0.1 | 18.8 | 94 | 2 after 17 hr |
| EA:BMA:HDD 1:1:0.01 | 21.9 | 95 | 2 after 24 hr |
| EA:BMA:AM:HDD 1:1:0.1:0.01 | 22.1 | 96 | 1 after 36 hr |

Key
1 - no observable damage
2 - slight movement of toner to give slight discolouration of paper.
Substrate: Modern chemical paper (1984) Book 105B.

The results indicate that mixtures which contain all 4 monomers namely EA:MMA:AM:HDD (5:1:0.1:0.01) and EA:BMA:AM:HDD (1:1:0.1:0.01) do not damage these susceptible papers even after 36 hours of preconditioning. It must be stressed that in those cases where damage was observed, ink movement was only slight, particularly in comparison with other solvents such as acetone or methanol.

BRIEF DESCRIPTION OF THE DRAWINGS

The polymerisation of monomer mixtures, especially ethyl acrylate/methyl methacrylate mixtures containing a multifunctional monomer, according to the invention will now be illustrated further, by way of example only, with reference to the accompanying FIGS. 1 to 5 in which:

FIG. 4 shows a plot of polymer yield versus weight of monomer addition on a modern mechanical paper substrate (newsprint) treated by monomer mixtures of the invention containing different amounts of multifunctional monomer and by a corresponding mixture free from multifunctional monomer;

Figure 1:
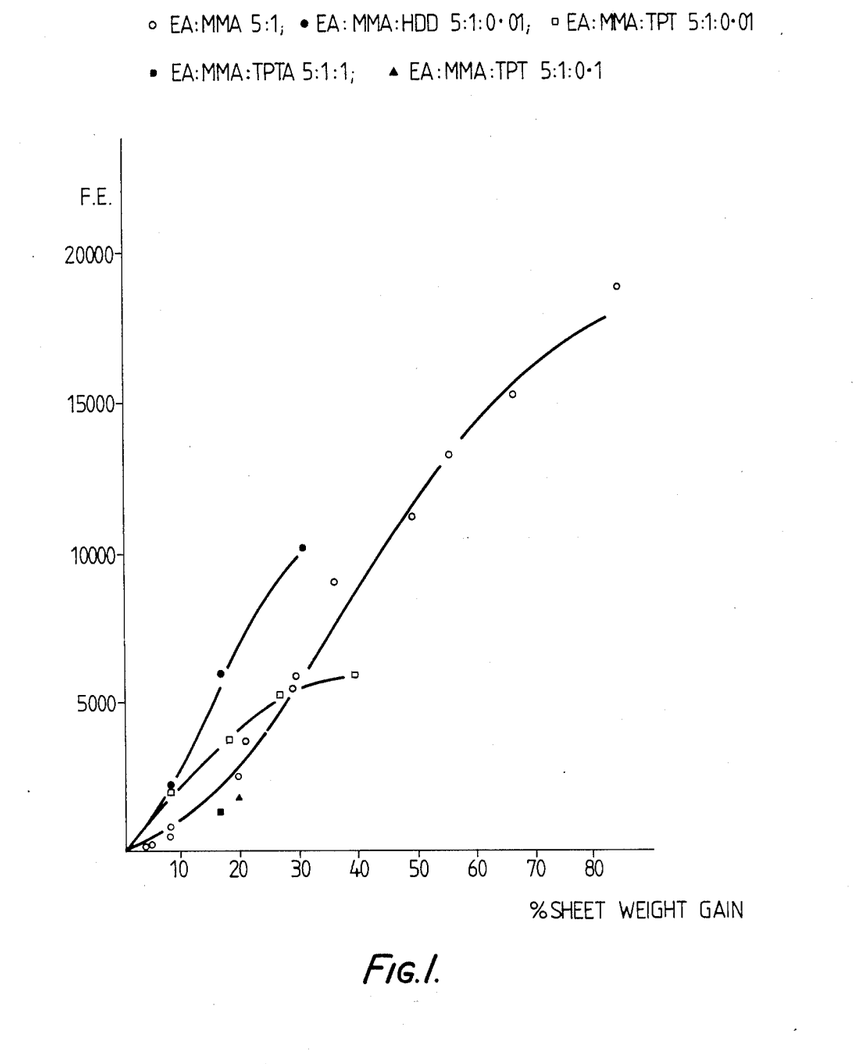
FIGS. 1 to 3 show plots of fold endurance versus weight gain for
(i) a pure cotton substrate (FIG. 1),
(ii) an aged mechanical substrate (FIG. 2), and
(iii) a modern mechanical substrate (Cox & Wyman paper) (FIG. 3)
treated by monomer mixtures of the invention containing multifunctional monomer and by corresponding mixtures free from multifunctional monomer.

In the processes whose results are shown in FIG. 1, 5:1 w/w mixtures of EA and MMA containing different multifunctional monomers were polymerised on various sheets of Whatman's filter paper at 0.5 to 0.6 MRad (0.023 MRad/hr) and at various percent monomer additions to give different percent weight increases of the paper. The fold endurance of the filter paper increased with increasing polymer deposition within the paper (the rate of increase being especially marked at low levels of deposition) and the increase was generally more marked with the mixtures containing multifunctional monomer. The EA:MMA:HDD (5:1:0.01) mixture gave especially good results.

Figure 2:
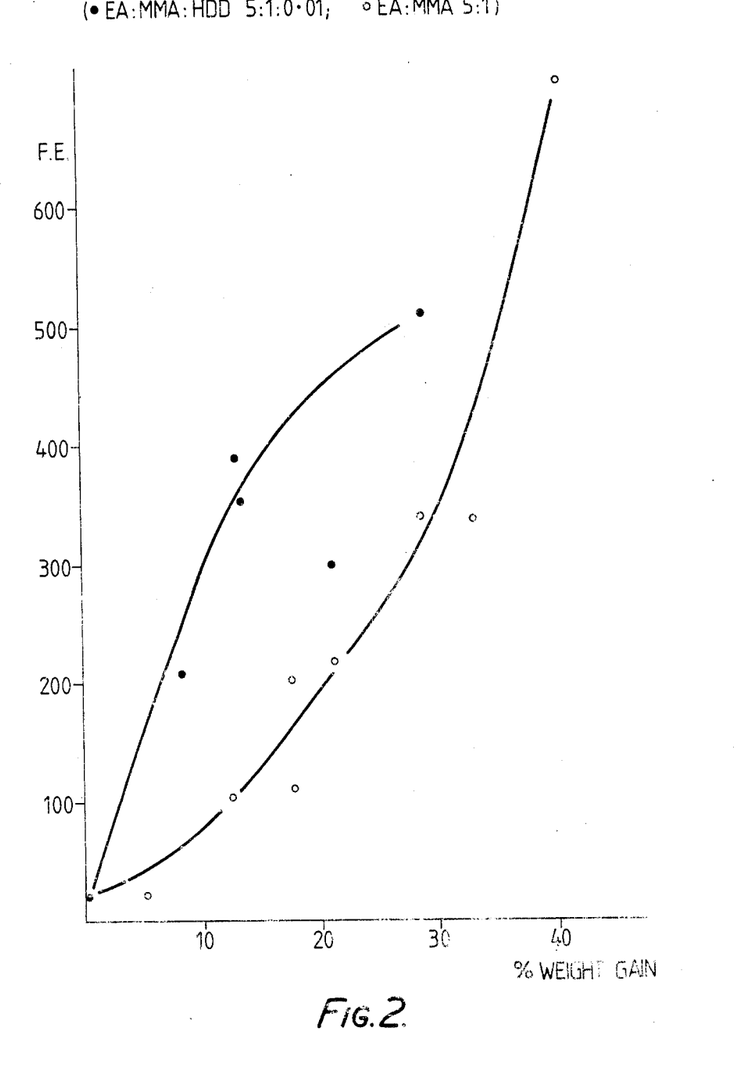
Figure 3:
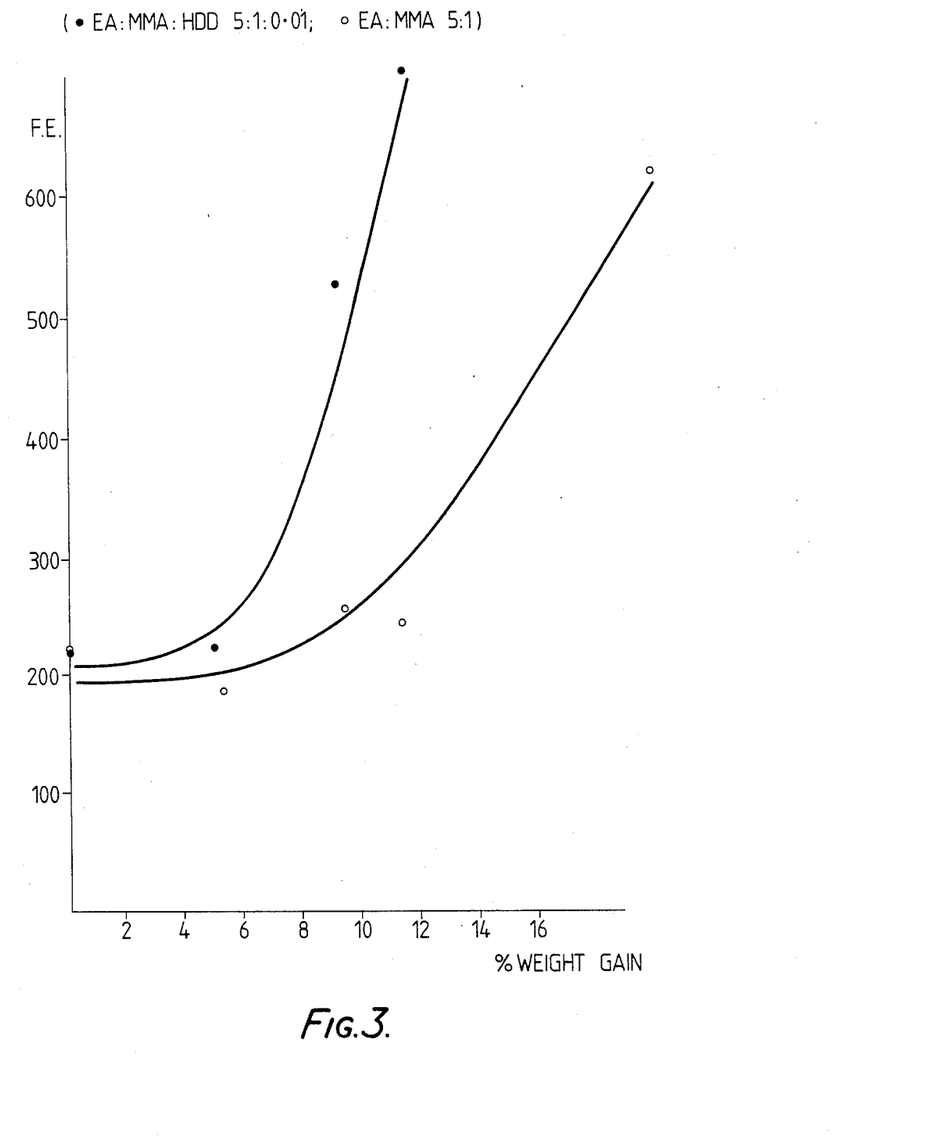

In the processes whose results are shown in FIGS. 2 and 3, the effect of this mixture is compared under the same conditions as for FIG. 1 above with that of the EA:MMA only mixture in modern and aged mechanical paper substrates. The modern mechanical paper substrate was Cox & Wyman paper and the aged mechanical paper substrate was book 8518 dating from the 1960s. Again the increase in weight gain led as expected to an increased fold endurance, the increase being more marked when the multifunctional monomer was present. For example, book sample 8518 (FIG. 2) an aged mechanical substrate, which is among the most difficult to treat, had an initial fold of 23, a fold of 100 on treatment with the standard mixture (EA:MMA 5:1) and a fold of 350 with the monomer mixture containing HDD. It is evident that extremely small amounts of HDD, in particular, can give rise to significant increases in fold endurance over the standard EA:MMA (5:1) monomer mixture. Strength improvements of up to 3 to 5 times were observed using the difunctional acrylate with mechanical and aged mechanical substrates at a weight gain of some 12% polymer.

In the process of FIG. 4, 5:1 EA:MMA mixtures containing 0.01 to 0.001 parts by weight of HDD and the EA:MMA mixture itself were polymerised at different total monomer additions on modern newsprint (Richard Clay newsprint) using 0.6-0.9 MRad and 0.022 MRad/hr. The yields were greater for HDD containing mixtures and at low levels of monomer addition the increase in yield was greater in the mixture containing the smaller proportion of HDD.

Figure 5:
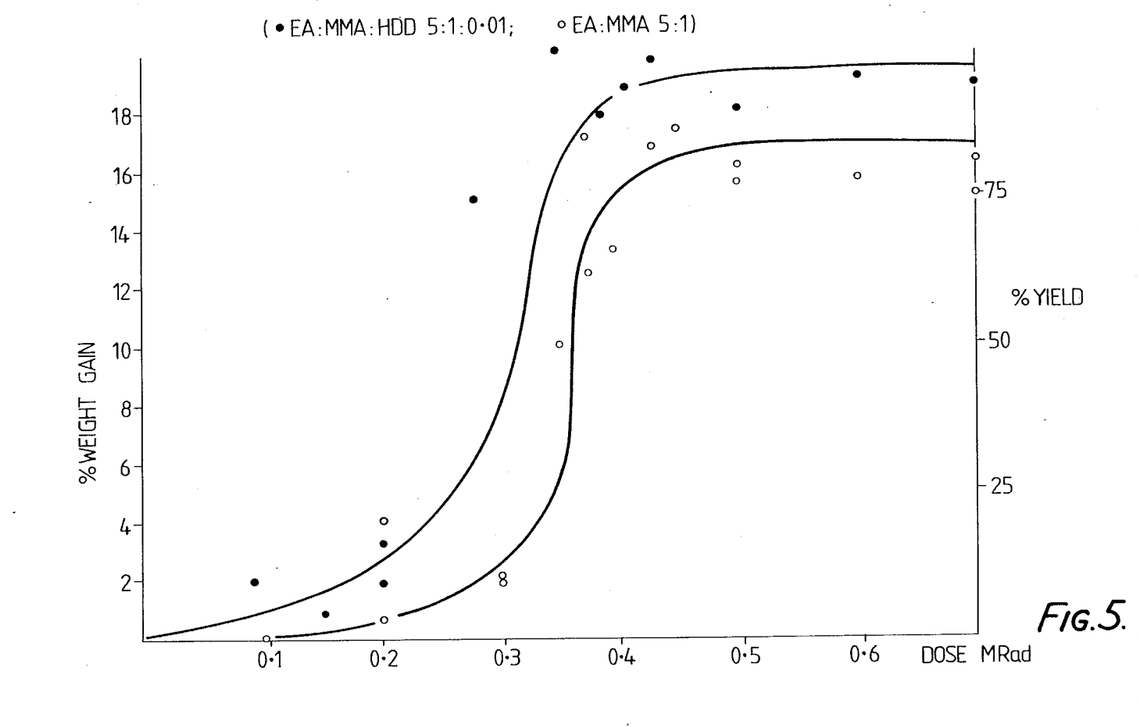
FIG. 5 shows a plot of weight gain and yield versus total radiation dose on a modern mechanical paper substrate (newsprint) treated by a monomer mixture of the invention containing multifunctional monomer and by a corresponding mixture free from multifunctional monomer.

In the process of FIG. 5 EA-MMA (5:1) and EA:MMA:HDD (5:1:0.01) mixtures were polymerised on modern mechanical substrate (Richard Clay newsprint) at a dose rate of 0.025 MRad/hr using 20% total addition. The weight gain was measured at different times. In each case the yield increased with increasing dose of radiation, but levelled off at higher doses. The multifunctional monomer-containing mixture gave consistently better yields than the EA:MMA mixture. Thus, the addition of HDD in the preferred ratio appears to reduce the total radiation dose required slightly and gives somewhat higher polymer yields of 95% compared to 85% for EA:MMA 5:1 only. However, further experimentation is required to verify these results.

We claim:

1. A process for the treatment of archival material comprising paper, which comprises the radiation-induced polymerisation, within the paper, of a monomer mixture comprising
   (i) one or more mono-unsaturated vinyl monomers selected from the esters of acrylic acid and the esters of α-lower alkyl-substituted acrylic acids, and
   (ii) one or more multi-unsaturated acrylate monomers, irradiation being carried out with γ-radiation or X-rays in the presence of the monomers, and the process being carried out in a substantially non-aqueous substantially solvent-free system.

2. A process for the treatment of archival material comprising paper, which comprises the radiation-induced polymerisation, within the paper, of a monomer mixture comprising
   (i) one or more mono-unsaturated vinyl monomers selected from the esters of acrylic acid and the esters of α-lower alkyl-substituted acrylic acids, and
   (ii) one or more multi-unsaturated acrylate monomers, irradiation being carried out with γ-radiation or X-rays in the presence of the monomers, and the process being carried out in a substantially non-aqueous system, the monomers being applied in bulk form by a non-immersion process in an amount of up to 50% by weight of the archival material.

3. A process for the treatment of archival material comprising paper, which comprises the radiation-induced polymerisation, within the paper, of a monomer mixture comprising
   (i) a mono-unsaturated vinyl monomer component comprising an ester of acrylic acid or an ester of acrylic acid and an ester of an α-lower alkyl-substituted acrylic acid, and
   (ii) one or more multi-unsaturated acrylate monomers, irradiation being carried out with γ-radiation or X-rays in the presence of the monomers, and the process being carried out with substantially no swelling of the fibres of the paper of the archival material.

4. A process as claimed in any one of claims 1 to 3, wherein the mono-unsaturated vinyl monomer component comprises an acrylic acid ester of the general formula $$CH_2=CH-COOR'$$

wherein R' represents a $(C_2-C_8)$-alkyl radical.

5. A process as claimed in claim 4, wherein ethyl acrylate is used.

6. A process as claimed in claim 5, wherein an improvement in yield per unit dose of radiation is obtained by:
(a) carrying out polymerisation in the presence of a suitable mono-unsaturated vinyl comonomer, or
(b) carrying out the process repetitiously, irradiation being carried out after each addition of the mono-unsaturated vinyl monomer component.

7. A process for the treatment of archival material comprising paper, which comprises the radiation-induced polymerisation, within the paper, of a monomer mixture comprising
(i) a mono-unsaturated vinyl monomer component comprising
(a) as major component an acrylic acid ester of the general formula $$CH_2=CH-COOR'$$

where R' represents a group of the general formula $C_{n'}H_{2n'+1}$ or $C_{n'}H_{2n'}OH$ in which n' represents an integer from 1 to 10; and
(b) as minor component an ester of an α-lower alkyl-substituted acrylic acid of the general formula $$CH_2=CR^2-COOR''$$

in which R'' represents a group of the general formula $$-C_nH_{2n+1}, -C_nH_{2n}X, \text{ or } -CH_2C_mH_{2m-1}$$

in which
n represents an integer from 1 to 16,
X represents OH, a halogen atom or an unsubstituted or mono- or di-lower alkyl-substituted amino group, and
m represents an integer from 2 to 15, and
$R^2$ represents a lower alkyl radical, and
(ii) one or more multi-unsaturated acrylate monomers, irradiation being carried out with γ-radiation or X-rays in the presence of the monomers, and the process being carried out in a substantially non-aqueous substantially solvent free system and with the avoidance of saturation of the archival material.

8. A process for the treatment of archival material comprising paper, which comprises the radiation-induced polymerisation, within the paper, of a monomer mixture comprising
(i) a mono-unsaturated vinyl monomer component comprising
(a) an acrylic acid ester or an ester of an α-lower alkyl-substituted acrylic acid, and
(b) a comonomer which provides an improvement in yield per unit dose of radiation and which is an acrylic acid ester or an ester of an α-lower alkyl-substituted acrylic acid, and
(ii) one or more multi-unsaturated acrylate monomers, irradiation being carried out with γ-radiation or X-rays in the presence of the monomers, and the process being carried out with substantially no swelling of the fibres of the paper of the archival material.

9. A process as claimed in claim 7 or claim 8, wherein the mono-unsaturated vinyl monomer component comprises ethyl acrylate.

10. A process as claimed in claim 9, wherein there is used as a mono-unsaturated vinyl comonomer an ester of an α-lower alkyl-substituted acrylic acid of the general formula $$CH_2=CCH_3-COOR''$$

in which R'' represents a $(C_1-C_8)$-alkyl radical.

11. A process as claimed in claim 4, wherein there is used a yield-enhancing monomer of the general formula $$CH_2=CCH_3-COOR''$$

in which R'' represents a $(C_1-C_8)$-alkyl radical.

12. A process as claimed in claim 11, wherein the mono-unsaturated vinyl comonomer is methyl methacrylate or butyl methacrylate.

13. A process as claimed in claim 12, wherein ethyl acrylate and methyl methacrylate are used in a ratio of from 20:1 to 1:1 by weight.

14. A process as claimed in claim 13, wherein the ratio is from 3:1 to 5:1.

15. A process as claimed in claim 12, wherein ethyl acrylate and butyl methacrylate are used in a ratio of from 2:1 to 1:2 by weight.

16. A process as claimed in claim 2, wherein component (i) comprises ethyl acrylate and methyl methacrylate in a ratio of from 3:1 to 5:1 by weight.

17. A process as claimed in claim 2, wherein component (i) comprises ethyl acrylate and butyl methacrylate in a ratio of from 2:1 to 1:2 by weight.

18. A process as claimed in claims 1, 2 or 3, wherein the vapour pressure of the mono-unsaturated vinyl monomer component at the temperature and pressure of the reaction is such that there is no substantial transfer of monomer from the paper.

19. A process as claimed in any one of claims 1, 2 or 3, wherein the monomer mixture used has a boiling point of at least 130° C. at atmospheric pressure.

20. A process as claimed in claim 19, wherein 2-ethylhexyl acrylate is used.

21. A process as claimed in any one of claims 1, 2, 3, 16 or 17, wherein the multi-unsaturated acrylate monomer component is up to 1% by weight of the total monomer mixture.

22. A process as claimed in claim 21, wherein the multi-unsaturated acrylate monomer component is no more than 0.2% by weight of the total monomer mixture.

23. A process as claimed in any one of claims 1, 2, 3, 16 or 17, wherein the multi-unsaturated acrylate monomer component comprises a multi-unsaturated or methacrylate.

24. A process as claimed in claim 23, wherein the multi-unsaturated acrylate monomer comprises 1,6-hexanediol diacrylate, 1,6-hexanediol dimethacrylate or 1,4-butanediol dimethacrylate.

25. A process as claimed in claim 22, wherein
(i)
(a) ethyl acrylate and
(b) methyl methacrylate or butyl methacrylate, and
(ii) 1,6-hexanediol diacrylate are used.

26. A process as claimed in claim 25, wherein ethyl acrylate, methyl methacrylate and 1,6-hexanediol diacrylate are used in a ratio of 5:1:0.01 by weight.

27. A process as claimed in claim 25, wherein ethyl acrylate, butyl methacrylate and 1,6-hexanediol diacrylate are used in a ratio of 1:1:0.0033 by weight.

28. A process for the treatment of archival material comprising paper, which comprises the radiation-induced polymerization, within the paper, of a monomer mixture comprising
   (i) a mono-unsaturated vinyl monomer component comprising ethyl acrylate and methyl methacrylate in a ratio of from 3:1 to 5:1 by weight, and
   (ii) a multi-unsaturated vinyl monomer component in an amount of up to 1% by weight of the total monomer mixture comprising one or more monomers comprising 1,6-hexanediol diacrylate, 1,6-hexanediol dimethacrylate or 1,4-butanediol dimethacrylate, irradiation being carried out with γ-radiation or X-rays in the presence of the monomers, and the process being carried out in a substantially non-aqueous substantially solvent-free system and with the avoidance of saturation of the paper of the archival material.

29. A process for the treatment of archival material comprising paper, which comprises the radiation-induced polymerization, within the paper, of a monomer mixture comprising
   (i) a mono-unsaturated vinyl monomer component comprising ethyl acrylate and butyl methacrylate in a ratio of from 2:1 to 1:2 by weight, and
   (ii) a multi-unsaturated vinyl monomer component in an amount of up to 1% by weight of the total monomer mixture comprising one or more monomers comprising 1,6-hexanediol diacrylate, 1,6-hexanediol dimethacrylate or 1,4-butanediol dimethacrylate, irradiation being carried out with γ-radiation or X-rays in the presence of the monomers, and the process being carried out in a substantially non-aqueous substantially solvent-free system and with the avoidance of saturation of the paper of the archival material.

30. A process as claimed in any one of claims 1 2, 3, 16, 17, 28 or 29, wherein the archival material comprises one or more bound volumes.

31. A process as claimed in any one of claims 1 2, 3, 16, 17, 28 or 29, wherein the polymerisation system contains a basic monomer.

32. A process as claimed in claim 31, wherein the basic monomer is an amine-substituted alkyl methacrylate.

33. A process as claimed in claim 32, wherein the basic monomer is α-(dimethylamino)ethyl methacrylate.

34. A process as claimed in claim 33, wherein the polymerisation system comprises ethyl acrylate, methyl methacrylate, α-(dimethylamino)ethyl methacrylate and 1,6-hexanediol diacrylate in a ratio of 5:1:0.1:0.01 by weight, or ethyl acrylate, butyl methacrylate, α-(dimethylamino)ethyl methacrylate and 1,6-hexanediol diacrylate in a ratio of 1:1:0.033:0.0033 by weight.

35. A process as claimed in claim 31, wherein the archival material comprises one or more entire books.

36. A process as claimed in claim 31, wherein the archival material comprises one or more bound volumes of newspapers and/or magazines.

37. A process as claimed in any one of claims 1, 2, 3, 16, 17, 28 or 29, wherein the fold endurance of the paper to be treated is at least 15.

38. A process as claimed in any one of claims 1, 2, 3, 16, 17, 28 or 29, wherein the total monomer addition is from 15 to 50% of the weight of the archival material.

39. A process as claimed in claim 38, wherein the total monomer addition is from 15 to 25% of the weight of the archival material.

40. A process as claimed in claim 38, wherein the total monomer addition is from 20% to 30% of the weight of the archival material.

41. A process as claimed in any one of claims 1, 2, 3, 16, 17, 28 or 29, wherein the increase in weight of the paper is at least 10%.

42. A process as claimed in any one of claims 1, 2, 3, 16, 17, 28 or 29, wherein the polymerisation yield is at least 60%.

43. A process as claimed in any one of claims 1, 2, 3, 16, 17, 28, or 29 wherein said monomer mixture is irradiated with a dose of gamma-rays in the range of from 0.1 to 1.5 MRad/hour.

44. The process of claim 43, wherein said dose is between 0.2 to 1 MRad/hour.

45. The process of claim 44, wherein said dose is 0.4 to 0.48 MRad/hour.

46. A process for the treatment of archival material comprising paper, which comprises the radiation-induced polymerisation, within the paper, of a monomer mixture comprising
   (i) one or more mono-unsaturated vinyl monomers selected from the esters of acrylic acid and the esters of α-lower alkyl-substituted acrylic acids, and
   (ii) one or more multi-unsaturated acrylate monomers, wherein repeated treatment is used, irradiation being carried out, after the addition of the mono-unsaturated vinyl monomer or monomer in each case, with γ-radiation or X-rays, and the process being carried out with substantially no swelling of the fibres of the paper of the archival material.

47. A process as claimed in claim 46, wherein the mono-unsaturated vinyl monomer component comprises ethyl acrylate.

* * * * *